S. PERRY.
Shovel-Plow.
No. 56,327.
Patented July 10, 1866.
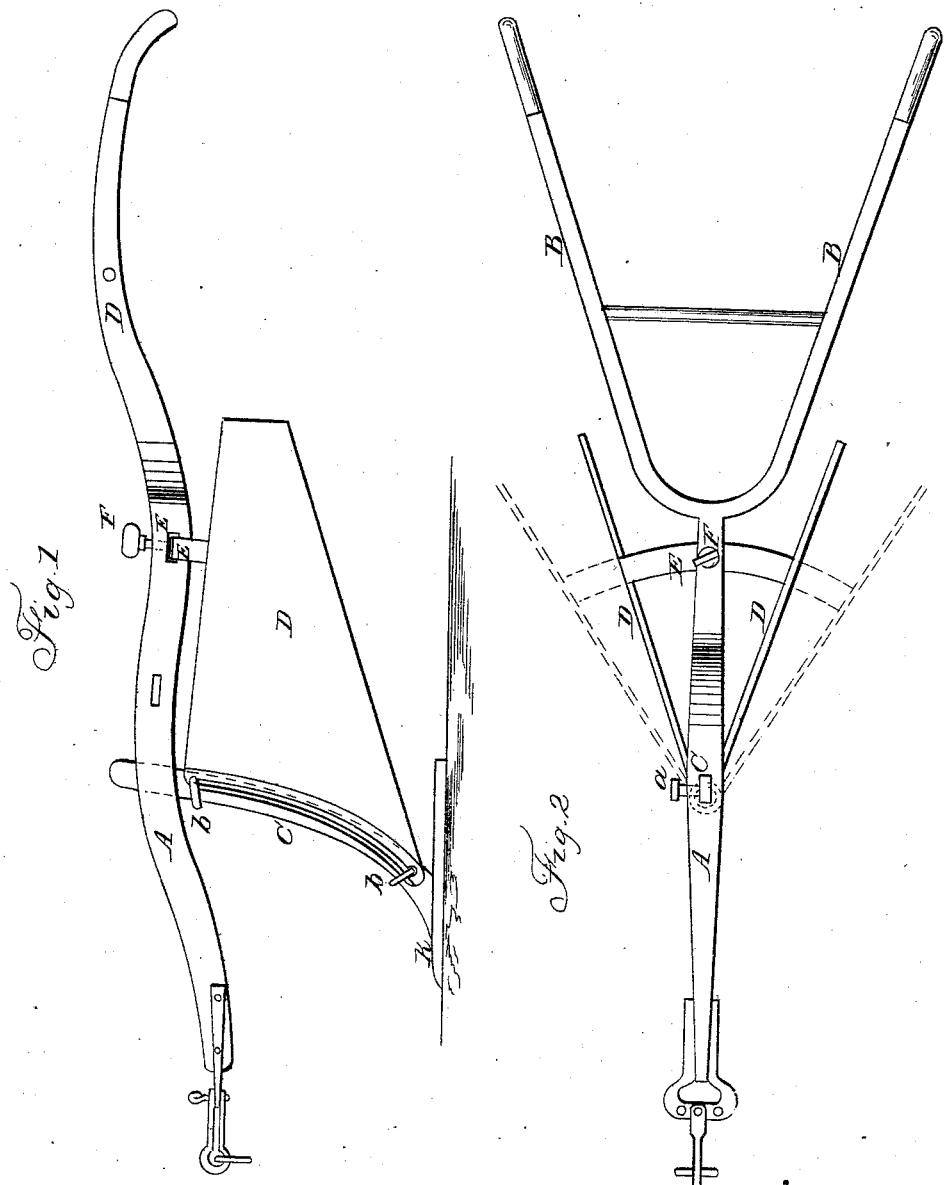
Witnesses:
Inventor
Saml Perry
By Munn & Co
Attys

UNITED STATES PATENT OFFICE.

SAMUEL PERRY, OF TROY, ASSIGNOR TO CHARLES H. FORT, OF WEST TROY, NEW YORK.

IMPROVEMENT IN FURROWING-PLOWS.

Specification forming part of Letters Patent No. 56,327, dated July 10, 1866.

*To all whom it may concern:*

Be it known that I, SAMUEL PERRY, of Troy, in the county of Rensselaer and State of New York, have invented a new and Improved Plow; and I do hereby declare that the following is a full, clear, and exact description thereof, which will enable those skilled in the art to make and use the same, reference being had to the accompanying drawings, forming part of this specification, in which—

Figure 1 is a side view of my invention; Fig. 2, a plan or top view of the same.

Similar letters of reference indicate corresponding parts.

This invention relates to a new and improved plow designed for furrowing the earth to receive the seed, and also for covering the seed after the same has been dropped or planted.

A represents the beam of the plow, which is provided with two standards, B B, at its rear end. These parts may be of usual construction, and therefore do not require any special description.

C represents a standard of curved form, the upper end of which is secured in a slot or mortise in the beam by means of a set-screw, $a$, the lower end of said standard having a flat share, K, attached, which is capable of making a much wider furrow than the ordinary plowshare.

The outer or front side of the standard C is concave, and is capable of being raised and lowered by means of the set-screw $a$, which passes through a slot in the plow-beam into holes in the standard C, and to said standard there are attached by joints $b$ two mold-boards, D D, one at each side of the standard, the front edges of the mold-board being even or in line with the front edge of the standard. These mold-boards have each an arm, E, attached, which pass through a slot in the beam, one arm being over the other and both allowed to slide freely in the slot, so that the mold-boards may be expanded and contracted—that is to say, have their rear ends adjusted nearer to or farther from each other, as may be desired, and secured at any desired point by a set-screw, F, which passes vertically into the beam and bears upon the upper arm, E.

When the device is used for furrowing the rear parts of the mold-boards are adjusted much nearer together, as the furrows do not require to be made very wide, and the furrow is almost entirely made by the flat share; but when the seed is to be covered the mold-boards D D are expanded, so as to extend or spread out between the furrows sufficiently wide to throw the earth therein and cover the seed, two seeds in two furrows being covered simultaneously.

The device is extremely simple, may be constructed at a small cost, and the beam and handles may be used for other purposes when desired. For instance, cultivator-teeth may be applied to the beam, as the mold-boards may be very readily detached.

By employing the flat share K, which makes a much wider furrow than the ordinary plowshare, in connection with the adjustable mold-boards D D, the latter will not be so liable to become clogged or foul in making seed-furrows, as they can be almost entirely closed, so that the furrow will be made principally by the share itself.

The clogging of the mold-boards, which is a source of great annoyance to the plowman, and which causes the loss of much time, as the team has to be stopped and the earth removed from the mold-boards, is almost entirely obviated by my arrangement of parts when seed-furrows are to be made; and when seed are to be covered my plow possesses all the advantages of plows with adjustable mold-boards.

I do not claim, broadly, a plow having adjustable mold-boards hinged to the plow-standard, as I am aware that such plows have been heretofore used; but What I do claim as new, and desire to secure by Letters Patent, is—

The adjustable standard C, having the flat share K attached to its lower end, in combination with the mold-boards D D, attached to said standard by links or joints and provided with arms E E, which pass through the beam and are secured by a set-screw, F, the whole being constructed and operated in the manner and for the purpose set forth.

SAML. PERRY.

Witnesses:
WM. DONOHUE,
M. RUSSELL.